United States Patent [19]

Kashiwabara et al.

[11] 4,401,657
[45] Aug. 30, 1983

[54] NUTRIENT COMPOSITION SUITABLE FOR ENTERAL FEEDING

[75] Inventors: Norio Kashiwabara, Tokyo; Hirotaka Maruyama, Kawagoe; Tetuo Ishii, Hidaka; Satoru Kondo, Tokyo, all of Japan

[73] Assignee: Snow Brand Milk Products Co., Ltd., Sapporo, Japan

[21] Appl. No.: 328,996

[22] Filed: Dec. 9, 1981

[30] Foreign Application Priority Data

Dec. 27, 1980 [JP] Japan .................................. 55-185079

[51] Int. Cl.³ .............................................. A61K 37/02
[52] U.S. Cl. ........................................ 424/177; 426/656
[58] Field of Search ......................... 424/177; 426/656

[56] References Cited

U.S. PATENT DOCUMENTS 2,481,414 9/1949 Grindrod ............................. 424/177
3,051,576 8/1962 Lendvai .............................. 426/656

OTHER PUBLICATIONS

Kogyo, *Food Industry*, XXII, No. 12 (1979) pp. 40-41.
Okabe et al., *Clinical Science of Nutrition*, pp. 89-91 (1979).
"The Japanese Journal of Parenteral and Enteral Nutrition," I, No. 1, 69-74 (1979).

*Primary Examiner*—Delbert R. Phillips
*Assistant Examiner*—F. T. Moezie
*Attorney, Agent, or Firm*—Wegner & Bretschneider

[57] ABSTRACT

Disclosed herein is a nutrient composition suitable for enteral feeding, characterized by its inclusion of skim milk powder, in which the content of lactose has been reduced to a specified range, as one of the protein sources and medium chain triglyceride as one of the fat sources, at the respective rates within the respectively specified ranges.

4 Claims, No Drawings

NUTRIENT COMPOSITION SUITABLE FOR ENTERAL FEEDING

BACKGROUND OF THE INVENTION

The present invention concerns a nutrient composition suitable for enteral feeding (tube feeding). The word "enteral feeding (tube feeding)" used herein means a kind of methods of so-called surgical nutrition used for nutritive care of patients before and after their surgical operation, and it is a method of injecting nutrients via a feeding tube into the gastrointestinal tract of a patient to whom oral feeding of the nutrients is impractical.

The nutrient composition for use in enteral feeding has been classified into elemental diet or chemically defined diet, synthetic low-residue diet and standard blenerized diet.

Elemental diet contains purified crystalline amino acids as the nitrogen source, and nutrient components such as essential fatty acids and vitamins are combined with them. Standard blenderized diet is prepared by combining milk or fruit juice with a fluidized mixture of various kinds of natural food. Synthetic low-residue diet has an intermediate composition of the above-mentioned two categories, and is in a powdery or a liquid state obtained by combining milk casein or egg-albumin as a protein source with fat source, carbohydrate source, inorganic salts and vitamins. It is used after dissolving into water or in an original liquid state.

The nutrient composition of the present invention belongs to the category of the above-mentioned synthetic low-residue diet.

Although various products have hitherto been commerciallized as the nutrient composition for use in enteral feeding, they have the following demerits: (1) they have many side effects causing diarrhea, abdominal pains, feeling of abdominal distension, etc., (2) they cause a raise of transaminase activity, however, only temporarily after administration, (3) their nitrogen balance is not favourable, (4) they taste bad and so are not suitable for oral administration, etc. Indeed, there are some compositions commerciallized with the intention of solving such demerits. For instance, the addition of lipids has been restricted to an extremely low level for control of diarrhea. However, in the case of insufficiency of nutrient supply as a result of aiming the prevention of side effects, such a composition lacks the aptitude as a nutrient.

It is for this reason that the nutrient composition suitable for enteral feeding without causing any side effects such as diarrhea, etc. and with a good taste, which can supply the necessary nutrients sufficiently, has not yet been developed.

On the other hand, the nutrient composition for enteral feeding is also used in the case where the patient is suffering from impairment of deglutition, impassableness through the digestive tracts, etc. in which case there is a necessity of early nutrient supplement after surgical operation, and it is further used in the case where the long term care should be taken on the patient's nutritive state. Accordingly, the provision of a nutrient composition without having the above-mentioned demerits has been strongly demanded.

For reference, the nutrient compositions for enteral feeding hitherto reported or commerciallized are exemplified as follows:

A composition is prepared by combining soy-bean, egg, skim milk, casein and essential amino acids as a protein source; vegetable fats and oils or medium chain triglyceride (MCT, powdery or liquid triglyceride of fatty acid of the medium chain length) as a fat source; and alpha-starch, bread and dextrin as a carbohydrate source, and after adding minerals and vitamins to the composition, it is made to be a liquid state with an addition of water ("SHOKUHIN KOGYO" (Food Industry), Vol. 22(12), page 41, 1979). A composition is prepared by combining skim milk powder, whole milk powder, dextrin, maltose, electrolytes and vitamin. Another composition is prepared by combining dextrin, starch syrup solid, medium chain triglycerides and natural foods. Still another composition is prepared by combining skim milk powder, tricaprylin, lactose and dextrin. (Refer to "RINSHO-EIYOGAKU (Clinical Science of Nutrition) by OKABE, Kazuhiko et al., page 90, published in 1979").

As a result of examination and studying the above-mentioned demerits seen in the publicly known nutrient composition for use in the above-mentioned enteral feeding, the present inventors have confirmed that these dermerits are caused by lactose which is contained in high amount (generally about 52 to 58% by weight) in the skim milk powder used generally as a protein source, the unbalance of amino acid within the protein source in the composition and the insufficiency of the fat content in the composition.

Further, it has been found by the present inventors that the lactose content in the nutrient composition could be reduced by combining 20 to 40% by weight of low-lactose skim milk powder containing a reduced amount of lactose which is obtained by decomposing 50 to 90% by weight of the originally contained lactose, as a kind of protein source and 5 to 15% by weight of medium chain triglyceride (MCT) as a kind of fat source, and that by doing so, the retention of the amino acid balance and the increase of fat content of the composition could be easily carried out by the combination of other protein sources and fat sources. The present invention is based on these findings.

The present invention will be explained in detail as follows:

DETAILED DESCRIPTION OF THE INVENTION

An object of the present invention is to provide a novel nutrient composition for use in enteral feeding, which has been accompanied by almost none of the demerits seen in the publicly known nutrient compositions for tube feeding, has an extremely low tendency of causing lactose intolerance and is capable to supply a high energy at a predetermined dose rate. The other objects of the present invention will be elucidated by the following description.

The characteristic feature of the present invention lies in a nutrient composition of a low-residue diet state containing a protein source, a fat source and a carbohydrate source as the base material, and having various trace nutrient components, in that the nutrient composition contains 20 to 40% by weight of skim milk powder which contains a reduced amount of lactose by decomposing 50 to 90% by weight of lactose as a kind of protein source and 5 to 15% by weight of medium chain triglyceride as a fat source.

The low-lactose skim milk powder which is one of the main components of the composition of the invention and in which the content of lactose has been reduced by decomposing 50 to 95% by weight of lactose, can be prepared by subjecting a mixture of skim milk powder and water to the action of lactose to decompose a part of lactose in the skim milk powder. It is necessary that the extent of decomposition of lactose in skim milk powder is controlled to be 50 to 90% by weight, preferably, 70 to 85% by weight. In the case of the extent of decomposition of larger than 95%, the lactose content in the composition becomes so small that the maintenance of the necessary amount of lactose in the human body necessary for absorption of calcium becomes impossible. On the other hand, in the case of the extent of decomposition of lactose of less than 50%, the lactose content of the composition becomes excess and causing diarrhea, abdominal pains and feeling of abdominal distension.

Medium chain triglyceride which is another main component of the composition of the present invention includes triglycerides of the fatty acids of 6 to 10 carbon atoms. Such triglyceride of the fatty acids of 6 to 10 carbon atoms shows the following specific properties as compared with triglycerides of the fatty acids of longer chain length of more than 12 carbon atoms: more rapid absorption in human body, no accumulation in the liver and reduction of cholesterol level in the body.

In addition, since the medium chain triglycerides can be easily mixed and emulsified with other fat sources such as vegetable oil such as corn oil, soybean oil, cotton-seed oil, safflower oil and sunflower oil or animal fats as milk fat or lard, it is possible to raise the fat content in the composition to the desired extent by combining the triglyceride with these fat sources.

The reason why the content of the skim milk powder which contains a reduced amount of lactose is defined in the range of 20 to 40% by weight in the composition is based on the easiness of retatining the amino acid balance in the composition by combining with other protein sources. As the protein sources used herein, milk casein and whole milk powder are suitable because of their good digestibility. In addition, purified crystalline essential amino acids may be combined with the composition, when necessary.

The reason why the content of the medium chain triglycerides (MCT) is defined to 5 to 15% by weight is to provide a nutrient composition with high calorie. In the case of the MCT content of less than 5% by weight, it is difficult to provide a nutrient composition with the desired high calorie even when other fat sources are combined, from the viewpoint of the absorption into the body, because the absorption of the fat sources other than the above-mentioned triglycerides are poorer. However, on the other hand, in the case of the content of larger than 15% by weight, the total content of fat source in the composition becomes in excess (more than 20% by weight) at the time when other fat source is combined for the supply of essential fatty acid such as linoleic acid. There is fear of causing diarrhea in the patient administered with such a composition.

Accordingly, it is necessary in the nutrient composition of the present invention to decide the combined amount of other fat source in connection with the content of the medium chain triglycerides.

Although in the composition of the present invention, both lactose remaining in the skim milk powder in which the content of lactose has been reduced and monosaccharides formed by the decomposition of lactose by lactase are present as carbohydrate, the amount of carbohydrate-supply due to them is insufficient and so it is necessary to combine separately another carbohydrate source with the composition.

The carbohydrate source used in the present invention includes various highly digestible carbohydrates, and since polysaccharide such as dextrin and starch syrup solid comprising water-soluble polysaccharides and dextrin restrain the raise of osmotic pressure of the composition of an aqueous solution type caused by the above-mentioned monosaccharides, they are preferable particularly. It is preferable to combine these carbohydrates in amount of 40 to 50% by weight of the nutrient composition.

In the present invention, in addition to the above-mentioned substances, inorganic salts, for instance, calcium salts, and iron salts and vitamins, for instance, vitamins A, $B_1$, $B_6$, C, D and E, nicotinamide, calcium pantothenate, folic acid, etc. as trace nutrient components may be added to the composition, and further, essential amino acids such as L-methionine, L-cystine and L-tryptophane may be added. Since in the composition of the present invention, essential amino acids derived from the above-mentioned protein sources are contained, in the time of adding the above-mentioned amino acids, it is preferable to control the amount of addition so that essential amino acid index (CAA index) becomes higher than 90. Further, as the above-mentioned inorganic salts, it is preferable to add in the form of calcium carbonate or iron and sodium succinate citrate. In addition, since the addition of other inorganic salts than calcium salt and iron salt raises the osmotic pressure of the composition of the present invention in the state of an aqueous solution, it is preferable to avoid such an addition.

Furthermore, since the nutrient composition of the present invention is applicable in oral feeding, components such as a fruit juice or flavor may be added.

In the case where the composition of the present invention is fed via a feeding tube to a patient who cannot orally ingest because of various impairments, the composition is mixed with water and the concentration of the composition in the aqueous mixture is adjusted to about 25% by weight so that the mixture can flow smoothly through a thin tube. In this case, since it is desirable that the above-mentioned mixture has an energy of a little higher than about 1 kcal/ml, the energy of the nutrient composition at a solid state is preferably made to be 400 to 500 kcal/100 g of the solid composition. Taking the nutritive balance into consideration, it is preferable that about 15 to 25 g of protein component, about 13 to 18 g of fat component containing about 4 to 6 g of oil as the source of essential fatty acid and about 40 to 65 g of carbohydrate component are contained in 100 g of the nutrient composition in a solid state. It is preferable that about 2.5 to 3.5 g of inorganic mineral component and suitable amounts of vitamins and amino acids are further contained in the composition. The above-mentioned formulation can be altered in meeting the requirement of the patient's body.

The important merits of the nutrient composition of the present invention over the commerciallized nutrient composition for enteral feeding are as follows:

(1) The composition of the present invention has very few side effects of causing diarrhea, abdominal pain and feeling of abdominal distension.

(2) A supply of the nutritive material of high contents of protein and fat can be prepared by the composition, and a high energy can be supplied by a single administration of a limited amount.

(3) The raise of transaminase activity by the administration of the composition of the present invention is a little, and the administration of the present composition does not exert any harmful influence on the hepatic function.

(4) On ingesting the present composition, nitrogen balance becomes positive from just after the surgical operation and the nutritive state of the patient becomes favourable.

(5) The absorption of calcium contained in the present composition is favourable and the occurrence of lactose-intorelance due to the administration of the present composition is very rare.

The constitution and the effects of the present invention will be concretely explained by the following examples of execution and test:

EXAMPLE 1

Preparation of the Skim Milk Powder Containing a Reduced Amount of Lactose

After introducing 900 liters of water and 100 kg of skim milk powder into a decomposing vessel of a capacity of 2000 liters and mixing the content uniformly by stirring, 400 g of lactase was further added to the mixture uniformly. Lactose in the skim milk powder was subjectd to decomposition by maintaining the temperature of the liquid mixture at about 7° C. About 200 liters of the specimen of the liquid mixture was collected three times, namely, after 7, 15 and 30 hours from the beginning of the decomposition, and each specimen was immediately spray-dried.

The extent of decomposition of lactose in each specimen was as follows:

| Specimen No. | Hours of decomposition | Extent of decomposition of lactose (%) |
| --- | --- | --- |
| 1 | 7 | 55 |
| 2 | 15 | 75 |
| 3 | 30 | 90 |

EXAMPLE 2

Preparation of the Nutrient Composition of the Present Invention

An aqueous mixture amounting to 1000 kg was obtained by adding 584 kg of water to 62 kg of milk casein, 1.3 kg of sodium carbonate for dissolving milk casein, 273 kg of starch syrup solid, 61 kg of medium chain triglyceride corresponding to 10% by weight of the product, 19 kg of corn oil, 13 g of vitamin A and D oil (containing both 500,000 I.U. of vitamin A and 50,000 I.U. of vitamin D per gram) and 15 g of dl-alpha-tocopherol (vitamin E). The solid content of the mixture thus prepared was 40% by weight. After pasteurizing and homogenizing the mixture, it was spray-dried to obtain 320 kg of the primary powder.

In the next place, by powder-to-powder mixing of 65 kg of the primary powder, 28 kg of the specimen No. 2 obtained in Example 1 (skim milk powder in which lactose has been decomposed to the extent of 75% by weight) corresponding to 28% by weight of the product, 6 kg of whole milk powder, 150 g of L-methionine, 150 g of L-cystine, 60 g of L-tryptophan, 140 g of calcium carbonate, 50 g of iron and sodium succinate citrate, 0.5 g of vitamin $B_1$, 1 g of vitamin $B_6$, 10.2 g of vitamin C, 4.5 g of nicotinic acidamide, 3.4 g of calcium pantothenate and 90 mg of folic acid, a product of the present invention was obtained. The analysis of 100 g of the product thus obtained was as follows:

20 g of protein, 15 g of fat (consisting of 9.8 g of medium chain triglyceride, 3 g of corn oil and others), 59 g of carbohydrate, 3.2 g of ash (consisting of 440 mg of calcium, 5 mg of iron and others), 1000 I.U. of vitamin A, 0.5 mg of vitamin $B_1$, 0.8 mg of vitamin $B_2$, 1 mg of vitamin $B_6$, 0.68 mg of vitamin $B_{12}$, 10.2 mg of vitamin C, 100 I.U. of vitamin D, 3.4 I.U. of vitamin E, 4.5 mg of nicotinamide, 3.4 mg of calcium pantothenate and 90 micrograms of folic acid, the presence of vitamin $B_2$ and vitamin $B_{12}$ in the product being derived from raw materials.

The calorific value of this product was 444 Kcal/100 g.

EXAMPLE 3

Preparation of the Nutrient Composition of the Present Invention

Another primary powder was prepared by at first making 1000 kg of an aqueous mixture of a solid content of 40% by weight by adding 584 kg of water to 64 kg of milk casein, 1.3 kg of sodium carbonate for dissolving milk casein, 275 kg of starch syrup solid, 31 kg of medium chain triglyceride corresponding to 5% by weight of the product, 45 kg of corn oil, 13 g of vitamin A and D oil (containing both 500,000 I.U. of vitamin A and 50,000 I.U. of vitamin D per gram) and 16 g of dl-alpha-tocopherol. After pasteurizing and homogenizing, the aqueous mixture was spray-dried.

In the next step, powder-to-powder mixing was carried out on 66 kg of thus prepared primary powder, 25 kg of the specimen No. 1 obtained in Example 1 of the extent of decomposition of lactose of 55% by weight (corresponding to 25% by weight of the product), 8 kg of whole milk powder, 190 g of L-cystine, 190 g of L-methionine, 60 g of L-tryptophane, 220 g of calcium carbonate, 50 g of sodium-iron succinate-citrate, 0.5 g of vitamin $B_1$, 1 g of vitamin $B_6$, 10.2 g of vitamin C, 4.5 g of nicotinamide, 3.4 g of calcium pantothenate and 90 mg of folic acid to obtain 100 kg of a product.

EXAMPLE 4

Preparation of the Nutrient Composition of the Present Invention

In the first step, a primary powder was prepared by making 1000 kg of an aqueous mixture of a solid content of 40% by weight by adding 586 kg of water to 42 kg of milk casein, 800 g of sodium carbonate for dissolving milk casein, 273 kg of starch syrup solid, 76 kg of medium chain triglycerides (corresponding to 10% by weight of the product), 22 kg of corn oil, 13 g of vitamin A and D oil containing 500,000 I.U. of vitamin A and 50,000 I.U. of vitamin D per gram, and 15 g of dl-alpha-tocopherol. After pasteurizing and homogenizing, the aqueous mixture was spray-dried.

In the next step, powder-to-powder mixing was carried out on 56 kg of the thus prepared primary powder, 40 kg of the specimen No. 3 obtained in Example 1 of the extent of decomposition of lactose of 90% by weight (corresponding to 40% by weight of the product), 3 kg of whole milk powder, 190 g of L-cystine, 190 g of L-methionine, 60 g of tryptophan, 50 g of iron and sodium succinate citrate, 0.5 g of vitamin $B_1$, 1 g of vitamin B₆, 10.2 g of vitamin C, 4.5 g of nicotinamide, 3.4 g of calcium pantothenate and 90 mg of folic acid to obtain 100 kg of a product.

EXAMPLE OF CLINICAL TEST 1

On administering each 150 ml of a 25% by weight aqueous mixture of the nutrient composition obtained in Example 2 to each of 30 postoperative patients via a feeding tube, no abnormal findings were observed except one case of diarrhea. However, according to the results of the same kind of experiment while using a commerciallized product of the same kind, in 19 cases out of 30 total cases, abnormal findings such as diarrhea, abdominal pain and feeling of abdominal distention were observed.

From these results, it is understood that the nutrient composition of the present invention does not cause any conspicuous side effect and is excellent in effectiveness.

EXAMPLE OF CLINICAL TEST 2

The organoleptic tests were carried out on the 100 hospitalized patients capable of oral ingestion. The samples were orally administered as each 150 ml of both of the two aqueous 25% by weight mixture at 38° C. of the nutrient composition obtained in Example 2 and a commerciallized composition of the same kind. According to the tests, the numbers of the patients who evaluated each of the solutions as preferable was as follows on every item of the question:

| Item | Composition of present invention | Commercialized composition |
|---|---|---|
| 1. Easiness in drinking | 81 | 19 |
| 2. Taste | 86 | 14 |
| 3. Flavor | 87 | 13 |
| 4. Mouth feel | 78 | 22 |
| 5. Aftertaste | 79 | 21 |

According to the above-mentioned results, it is seen that the composition of the present invention is superior to the commerciallized composition in all the items of evaluation and is also suitable for oral administration.

What is claimed is:

1. A nutrient composition of low-residue diet based on protein source, fat source and carbohydrate source, having other nutritive components combined with said sources, suitably applicable for enteral feeding, which comprises 20 to 40% by weight of skim milk powder, obtained by decomposing 50 to 95% by weight of lactose contained in the original skim milk powder, as a kind of said protein source and 5 to 15% by weight of medium chain triglycerides as a kind of said fat source.

2. A nutrient composition according to claim 1, wherein said protein source other than said skim milk powder is milk casein and/or whole milk powder.

3. A nutrient composition according to claim 1, which comprises 18 to 25% by weight of protein, 13 to 18% by weight of fat and 40 to 65% by weight of carbohydrate as solid matters.

4. A nutrient composition according to claim 1 or claim 3, which is in an aqueous liquid state and contains about 25% by weight of ingredients other than water.

* * * * *